United States Patent
Nath et al.

(10) Patent No.: US 12,392,226 B2
(45) Date of Patent: Aug. 19, 2025

(54) MECHANICAL HOLD DOWN WITH INTERNAL STRAINER

(71) Applicant: Ravdos Holdings Inc, Missouri City, TX (US)

(72) Inventors: Chinmoy Nath, Midland, TX (US); Christopher Valenzuela, Midland, TX (US)

( * ) Notice: Subject to any disclaimer, the term of this patent is extended or adjusted under 35 U.S.C. 154(b) by 0 days.

(21) Appl. No.: 18/615,844

(22) Filed: Mar. 25, 2024

(65) Prior Publication Data

US 2024/0229612 A1     Jul. 11, 2024

Related U.S. Application Data

(63) Continuation of application No. 16/965,159, filed as application No. PCT/US2019/015373 on Jan. 28, 2019, now Pat. No. 12,091,946.

(60) Provisional application No. 62/623,366, filed on Jan. 29, 2018.

(51) Int. Cl.
    *E21B 43/12*      (2006.01)
    *B01D 35/02*     (2006.01)
    *E21B 43/08*      (2006.01)

(52) U.S. Cl.
    CPC ............ *E21B 43/086* (2013.01); *B01D 35/02* (2013.01); *E21B 43/121* (2013.01); *E21B 43/127* (2013.01); *B01D 2201/02* (2013.01); *B01D 2201/4084* (2013.01)

(58) Field of Classification Search
    CPC ...... E21B 43/127; E21B 43/121; E21B 43/38; E21B 43/086
    See application file for complete search history.

(56) References Cited

U.S. PATENT DOCUMENTS

| | | | |
|---|---|---|---|
| 2,501,237 | A | 3/1950 | Sanders |
| 12,091,946 | B2 * | 9/2024 | Nath ............... E21B 43/086 |

FOREIGN PATENT DOCUMENTS

RU          154005 U1     8/2015

OTHER PUBLICATIONS

Google Patent Translation RU154005U1.
Declaration of Santhosh Ramaswamy.

* cited by examiner

*Primary Examiner* — Kenneth L Thompson

(57) ABSTRACT

A mechanical hold down for use with a pump assembly containing a seat nipple including: (i) a mandrel having a top edge, an external threaded region, a bottom tapered seat member, and an interior bore; (ii) a top bushing having a bushing interior bore, an upper external threaded section, and a lower internal threaded section engaged with the external threaded region of the mandrel; wherein the mandrel top edge is within an interior space defined by the engagement of the mandrel with the bushing; and (iii) an internal strainer assembly including a strainer bushing positioned in the interior space that has a lower edge abutting the mandrel top edge, a strainer affixed to the strainer bushing and extending through at least a portion of the mandrel's interior bore, and an intermediate element positioned about the mandrel and below the mandrel external threaded region that defines a tapered external surface.

20 Claims, 5 Drawing Sheets

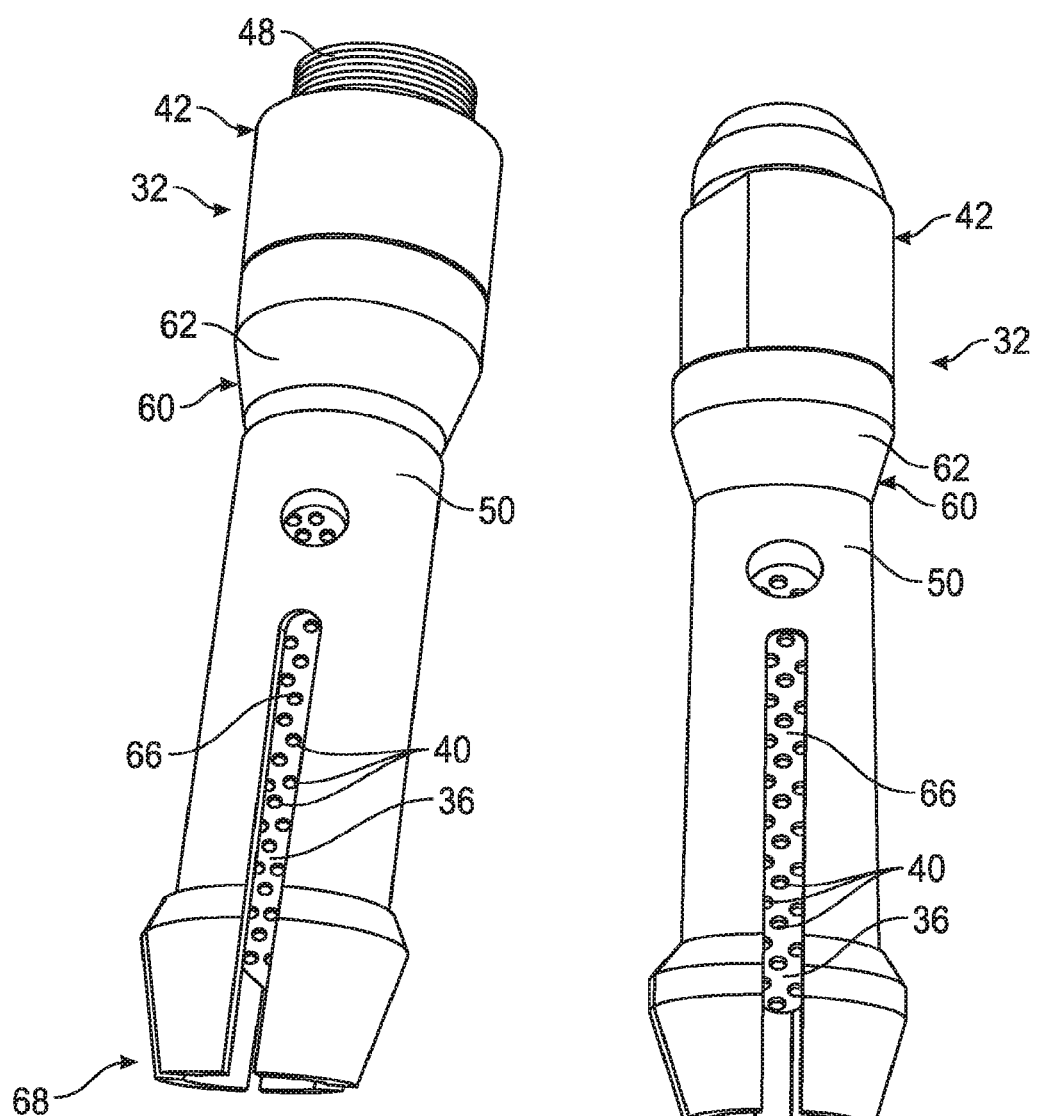

MECHANICAL HOLD DOWN WITH INTERNAL STRAINER

CROSS-REFERENCE TO RELATED APPLICATION

The present document is based on and claims priority to U.S. patent application Ser. No. 16/965,159, which is a National Stage Entry of PCT/US2019/015373 (to which priority is also claimed), which claimed priority to U.S. Provisional Application Ser. No. 62/623,366, filed Jan. 29, 2018, (to which priority is also claimed). Each of the referenced applications is hereby incorporated herein by reference in its entirety.

BACKGROUND

Downhole rod lift pumps are used in a variety of well applications to pump well fluids to a surface collection location. The downhole rod lift pumps have a strainer which strains the inflowing well fluids to prevent downhole solids from flowing into the pump. Various existing strainers have a washer welded to a perforated gauge plate and this assembly is secured within the pump. Often, however, such an assembly may be poorly mated with corresponding pump components and thus susceptible to fracture or other damage.

SUMMARY OF THE DISCLOSURE

In general, a system and methodology are provided for use in a well to filter solids during a pumping operation. The system may comprise a downhole pump, e.g. a downhole rod lift pump, having a pump housing through which a well fluid is moved during pumping of the well fluid. The pump housing is configured to receive a filter assembly which filters solids from the well fluid during pumping. The filter assembly may comprise a strainer having a filter section and a strainer bushing affixed to the filter section. The filter section may have a plurality of filter holes sized to aid in the filtration of solids. The filter assembly also may comprise a mechanical hold down having an interior sized to receive the filter section. An external bushing is secured to the mechanical hold down in a manner which holds the filter section within the mechanical hold down.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and:

FIG. 6 is an illustration of the filter assembly of FIG. 4 but in assembled form, according to an embodiment of the disclosure; and FIG. 7 is an illustration of the filter assembly of FIG. 5 but in assembled form, according to an embodiment of the disclosure.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology to facilitate filtration of solids with respect to well fluid during a pumping operation. The system may comprise a downhole pump, e.g. a downhole rod lift pump, having a pump housing through which a well fluid is moved during pumping of the well fluid. The pump housing is configured to receive a filter assembly which filters solids from the well fluid during pumping.

The filter assembly may comprise a strainer having a filter section and a strainer bushing affixed to the filter section. The filter section may have a plurality of filter holes sized to aid in the filtration of solids. In some embodiments, the filter section is generally conical in shape and the filter holes are arranged to filter fluid as it flows from an exterior to an interior of the conical filter section. The filter assembly also may comprise a mechanical hold down having an interior sized to receive the filter section. An external bushing is secured to the mechanical hold down in a manner which holds the filter section within the mechanical hold down.

The filter assembly may be used in downhole rod lift pumps and in various other types of downhole pumps or pumps used in other types of environments and applications. In general, the filter assembly uses a strainer to prevent downhole solids from flowing into the pump during pumping of fluid, e.g. well fluid. The filter assembly positions the strainer in a mechanical hold down and is able to entrap or block solids to ensure the efficiency of the pump is not compromised by the solids.

An advantage of the filter assembly is derived from the position and location at which it is installed. As explained in greater detail below, the strainer has a filter section combined with a bushing, e.g. a machined bushing. The filter section is disposed within the mechanical hold down and the bushing is secured within the mechanical hold down. In this manner, the strainer is secured, protected, and kept from interfering with outside mating components without restricting flow into the pump and without risk of poorly mated components.

Figure 1:
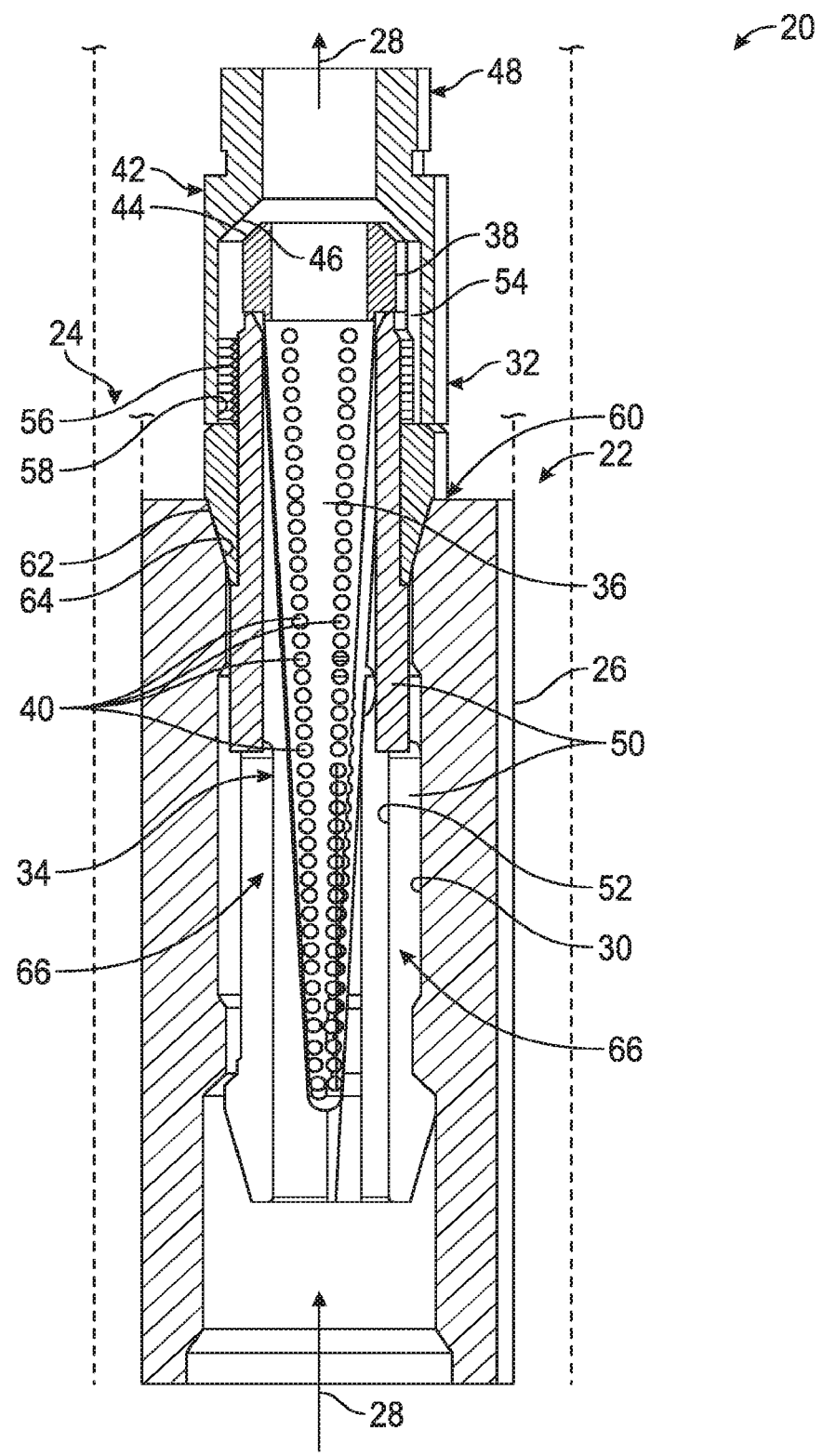
FIG. 1 is an illustration of an example of a filter assembly positioned in a pump housing of a downhole pump, such as a downhole rod lift pump, according to an embodiment of the disclosure.

Referring generally to FIG. 1, an example of a pumping system 20 is illustrated as comprising a pump 22 deployed downhole for use in a well, e.g. in a wellbore 24. By way of example, the pump 22 is in the form of a downhole rod lift pump although other types of pumps may be used. In the example illustrated, the pump 22 comprises a pump housing 26, e.g. a seat nipple, through which a well fluid is moved during pumping of the well fluid, as indicated by arrows 28. The pump housing/seat nipple 26 is configured with a hollow interior 30 sized to receive a hold down filter assembly 32. For a variety of pumping applications, the rod lift pump 22 is conveyed downhole into a borehole, e.g. wellbore 24, and the rod lift pump 22 is operated to pump the well fluid 28 to a suitable surface collection location.

Figure 2:
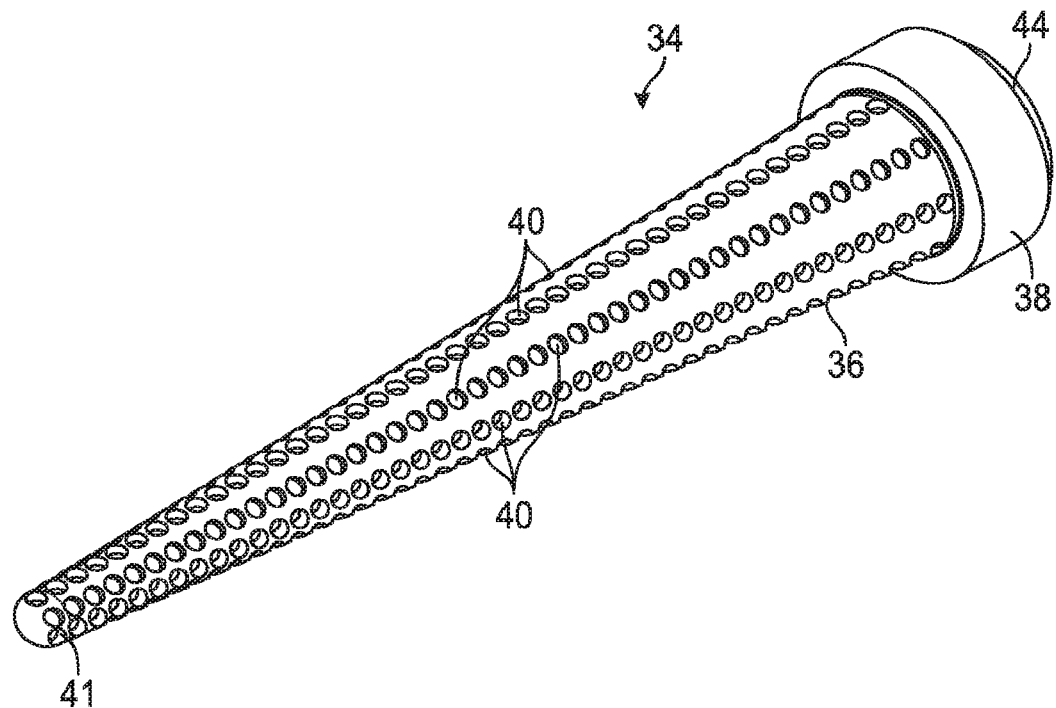
FIG. 2 is an illustration of an example of a strainer which may be used in the filter assembly, according to an embodiment of the disclosure.

In the illustrated embodiment, the hold down filter assembly 32 comprises a strainer 34 having a filter section 36 and a strainer bushing 38, as further illustrated in FIG. 2. By way of example, the strainer bushing 38 may be welded to an end of filter section 36 or attached thereto by other suitable connector or connection technique. The filter section 36 may comprise a plurality of filter openings 40, e.g. filter holes, sized to aid in filtration of solids.

In some embodiments, the filter section 36 may be conical in shape. The conical shape may be oriented such that the filter section 36 continually tapers to a smaller external diameter until reaching the smallest diameter at a bottom 41 of the filter section 36. According to one example, the filter section 36 may be constructed from a sheet material formed in a generally conical shape with the filter openings 40 arranged to filter fluid as it flows from an exterior to an interior of the conically shaped filter section 36.

Figure 3:
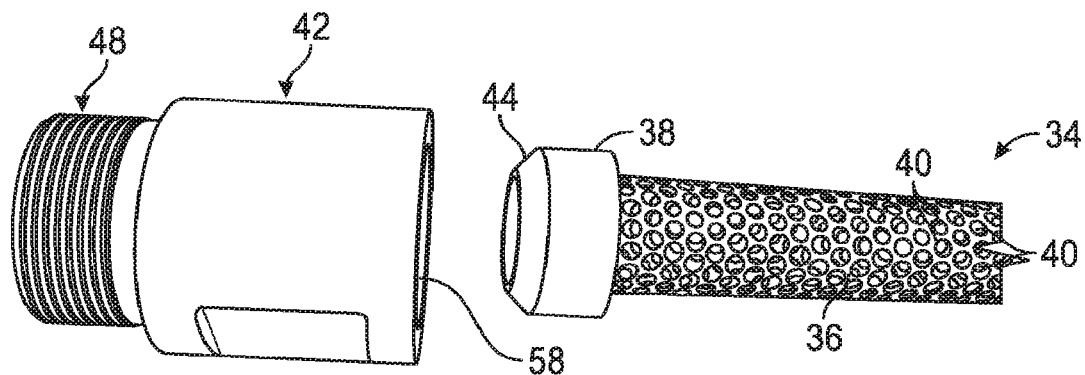
FIG. 3 is an illustration of an example of a strainer and a corresponding external bushing, according to an embodiment of the disclosure.

With additional reference to FIG. 3, the hold down filter assembly 32 also may comprise an external bushing 42 having an interior sized to receive the strainer bushing 38. By way of example, the strainer bushing 38 may have a tapered surface 44 oriented for sealing engagement with a corresponding internal surface 46 of external bushing 42 (see FIG. 1). In some embodiments, the external bushing 42 also may comprise a threaded top end 48 which may be used to help secure the filter assembly 32 into pump 22. For example, the threaded top end 48 may be used to secure the filter assembly 32 into a cage section of a downhole rod lift pump.

Figure 4:
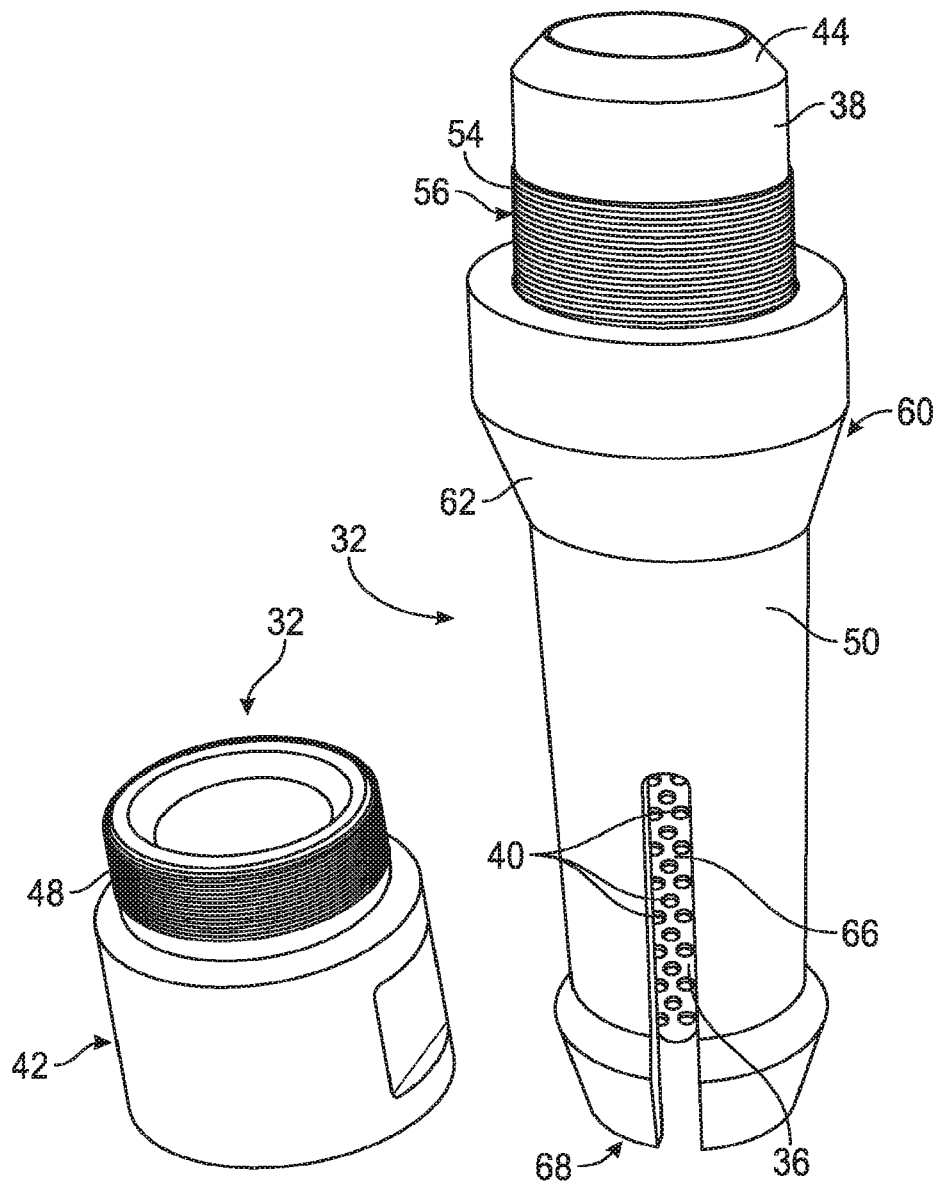
FIG. 4 is an illustration of an example of a filter assembly in which the strainer has been inserted into a mechanical hold down and prior to attaching the external bushing, according to an embodiment of the disclosure.
Figure 5:
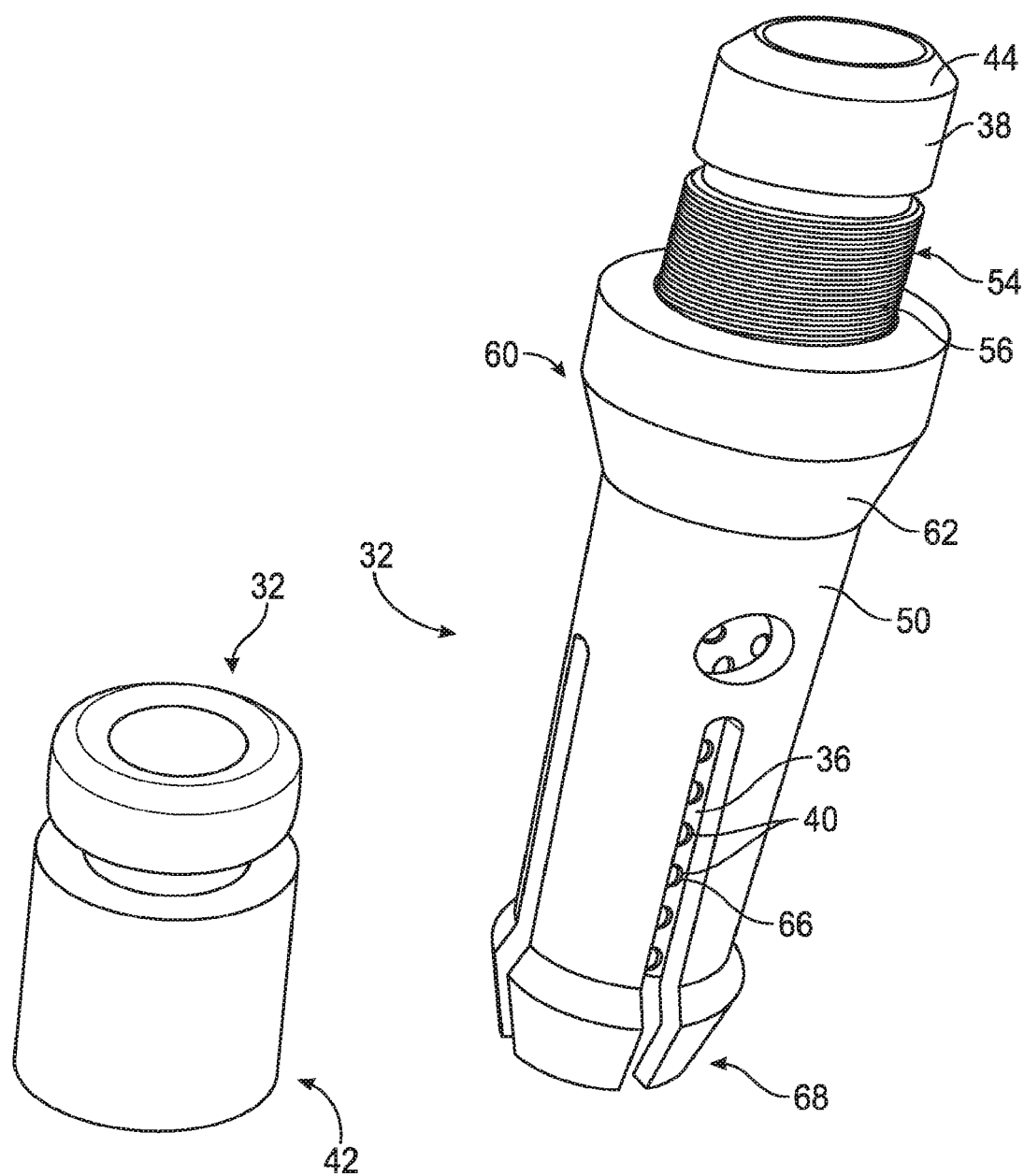
FIG. 5 is an illustration of another example of a filter assembly in which the strainer has been inserted into a mechanical hold down and prior to attaching the external bushing, according to an embodiment of the disclosure.

Referring also to the embodiments illustrated in FIGS. 4 and 5, each embodiment of filter assembly 32 may further comprise a mechanical hold down 50 which has an interior 52 sized to receive the filter section 36 of strainer 34 (see also FIG. 1). The mechanical hold down 50 may have a top end 54 sized such that strainer bushing 38 rests against the top end 54 when the filter section 36 is inserted into interior 52. It should be noted FIGS. 4 and 5 illustrate two slightly different embodiments of the filter assembly 32. However, other sizes and configurations of filter assembly 32 may be constructed to suit parameters of a given pumping application.

In some embodiments, the top end 54 may comprise an external threaded region 56 to which the external bushing 42 may be secured. In FIGS. 6 and 7, the two embodiments of FIGS. 4 and 5, respectively, are illustrated with the external bushing 42 threadably secured to the mechanical hold down 50. By way of example, the external bushing 42 may have an internal threaded region 58 which may be threadably engaged with external threaded region 56 to trap strainer bushing 38 between mechanical hold down 50 and external bushing 42. This, in turn, secures the filter section 36 within the protected interior 52 of mechanical hold down 50.

Depending on the parameters of a given application, environment, and/or pump structure, the mechanical hold down 50 may have a variety of configurations. In the illustrated embodiment, for example, the mechanical hold down 50 comprises a tapered section 60 having an external surface 62 oriented to seal against a corresponding surface 64 of the pump housing 26 (see FIG. 1).

The mechanical hold down 50 also may comprise a slot 66 or a plurality of slots 66 position to accommodate flow of the well fluid to the filter section 36. For example, well fluids flowing into the pump 22 are able to readily flow through slots 66 of mechanical hold down 50 and through openings 40 of filter section 36 so as to move into the interior of filter section 36. From the interior of filter section 36, the well fluids are able to flow up through pump 22 as the well fluids are pumped to the surface or to other suitable collection locations. In some embodiments, the mechanical hold down 50 also may comprise a tapered seat member 68 which, in some pump configurations, can be used to seat the pump at its operational, downhole location.

Effectively, the filter assembly 32 provides an improved approach to protecting, handling, and utilizing filters in pumps 22, e.g. in downhole rod lift pumps. The mechanical hold down 50 may be in the form of a hold down mandrel, as described above, which allows the filter assembly to be completed as a single unit. This configuration is beneficial because it reduces the number of moving parts (or potentially moving parts) in the hole while the pump 22 is running and/or while assembling the pump 22. Additionally, the strainer 34 is enclosed and protected. The strainer bushing 38 also provides a mechanism for securing the strainer 34 within mechanical hold down 50 and external bushing 42 without placing undesirable stress on mating parts. As a result, the life of the pump 22 is increased and the pump is less prone to vibrate during operation downhole.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

The invention claimed is:

1. A mechanical hold down for use with a downhole rod lift pump assembly including a rod lift pump and a seat nipple, the mechanical hold down comprising:
   a mandrel comprising:
      a top section, the top section comprising a top edge and an external threaded region, the external threaded region extending in a direction substantially perpendicular to the top edge;
      a bottom section comprising a tapered seat member adapted for engagement with the seat nipple to seat the pump at a downhole location;
      an interior bore extending longitudinally through the mandrel; and
      a plurality of slots extending longitudinally through at least a portion of the bottom section of the mandrel;
   a top bushing comprising:
      a bushing interior bore extending longitudinally through the top bushing;
      an upper external threaded section; and
      a lower internal threaded section, the top bushing lower internal threaded section being threaddedly engaged with the external threaded region of mandrel;
   wherein the top edge of the mandrel is positioned within an interior space defined by the engagement of the mandrel with the bushing; and
   an internal strainer assembly comprising:

a strainer bushing positioned within the interior space defined by the engagement of the mandrel and the bushing, the strainer bushing having a lower edge, the strainer bushing lower edge abutting the top edge of the mandrel;

a strainer affixed to the strainer bushing and extending longitudinally through at least a portion of the interior bore of the mandrel; and an intermediate element positioned about a section of the mandrel below the external threaded region of the mandrel, the intermediate element defining a tapered external surface adapted to engage a surface of the seat nipple.

2. The mechanical hold down of claim 1 wherein the strainer extends longitudinally through at least a portion of the bottom section of the mandrel that includes the plurality of slots.

3. The mechanical hold down of claim 1 wherein the strainer has a conical shape.

4. The mechanical hold down of claim 1 wherein the top bushing defines an upper internal surface and the strainer bushing defines an upper external surface, and wherein the upper internal surface of the top bushing is adapted to mate with the upper external surface of the strainer bushing.

5. The mechanical hold down of claim 1 wherein the strainer bushing is welded to the strainer.

6. The mechanical hold down of claim 5 wherein the strainer is formed from a sheet of material formed into a conical shape.

7. The mechanical hold down of claim 1 wherein the rod lift pump assembly includes a cage section and the upper external threaded section of the top bushing is adapted to engage the cage section.

8. A system for holding down a downhole rod pump and straining pump fluids, the system comprising:
 a seat nipple, the seat nipple comprising an upper surface and a lower engagement feature;
 a mandrel comprising:
  a top edge surface and an external threaded region;
  an interior bore extending longitudinally through the mandrel; and
  a tapered section positioned in engagement with the seat nipple;
 a top bushing comprising:
  a bushing interior bore extending longitudinally through the bushing;
  an upper external threaded section; and
  a lower internal threaded section, the lower internal threaded section being threadedly engaged with the external threaded region of mandrel;
 wherein the top edge surface of the mandrel is positioned within an interior space defined by the engagement of the mandrel and the bushing;
 an internal strainer assembly comprising:
  a strainer bushing positioned within the interior space defined by the engagement of the mandrel and the bushing, the strainer bushing having a lower edge surface, the straining bushing lower edge surface resting on the top surface of the mandrel; and
  a strainer affixed to the strainer bushing and extending longitudinally through the interior bore of the mandrel.

9. The system of claim 8 further comprising an intermediate element positioned about a section of the mandrel below the external threaded region of the mandrel, the intermediate element defining a tapered external surface adapted to engage a surface of the seat nipple.

10. The system of claim 8 further comprising a rod lift pump comprising a cage section, wherein the upper external threaded section of the top bushing is secured to the cage section.

11. The system of claim 8 wherein the strainer bushing interior bore has a first internal diameter, the interior bore extending longitudinally through the mandrel has a second internal diameter, and the first internal diameter is less than the second internal diameter.

12. The system of claim 8 wherein at least a portion of the strainer bushing extends into the interior bore of the mandrel.

13. The system of claim 8 wherein at least a portion of the strainer extends above the external threaded region of the mandrel.

14. The system of claim 8 wherein the strainer has a maximum external diameter, the mandrel has a maximum external diameter, and the top bushing has a maximum internal diameter, and wherein the maximum internal diameter of the top bushing is greater than the maximum outer diameter of the mandrel and wherein the maximum outer diameter of the mandrel is greater than the maximum outer diameter of the strainer bushing.

15. The system of claim 8 wherein the length of the strainer bushing in the longitudinal direction is greater than the width of the strainer bushing in the direction perpendicular to the longitudinal direction.

16. The system of claim 8 wherein at least a portion of the strainer bushing extends into the interior bore of the mandrel.

17. The system of claim 8 wherein the longitudinal length of the top bushing interior bore is greater than the combined longitudinal lengths of the strainer bushing and the external threaded region of the mandrel.

18. A mechanical hold down for engaging with a seat nipple, the mechanical hold down comprising:
 a mandrel comprising:
  a top edge surface and an external threaded region;
  an interior bore extending longitudinally through the mandrel; and
  a tapered section configured to engage a seat nipple;
 a top bushing comprising:
  a bushing interior bore extending longitudinally through the bushing;
  an upper external threaded section;
  an upper internal surface defining a first taper; and
  a lower internal threaded section, the lower internal threaded section being threadedly engaged with the external threaded region of mandrel; and
 an internal strainer assembly comprising:
  an edge surface resting on the top surface of the mandrel; and
  an upper edge surface defining a second taper, wherein the second taper is adapted to align with a strainer bushing positioned between the mandrel and the bushing, the strainer bushing comprising:
   a lower first taper; and
   a strainer affixed to the strainer bushing and extending longitudinally through at least a portion of the interior bore of the mandrel.

19. The mechanical hold down of claim 18 wherein the engagement of the top bushing with the mandrel limits the mechanical stress placed on the strainer bushing.

20. The mechanical hold down of claim 18 wherein the longitudinal length of the strainer bushing is greater than the width of the strainer bushing.

* * * * *